United States
Aldrich et al.

[11] 3,846,014
[45] Nov. 5, 1974

[54] LIQUID CRYSTAL DISPLAY CONTAINING AN ADDITIONAL BROAD ANGLE BACK SCATTERING MATERIAL

[75] Inventors: Ralph E. Aldrich, Acton, Mass.; William A. Simmons, Jr., Nashua, N.H.

[73] Assignee: Itek Corporation, Lexington, Mass.

[22] Filed: July 2, 1973

[21] Appl. No.: 375,979

[52] U.S. Cl............................ 350/160 LC, 350/164
[51] Int. Cl. .............................................. G02f 1/16
[58] Field of Search........................ 350/160 LC, 164

[56] References Cited
UNITED STATES PATENTS
3,748,018  7/1973  Borden, Jr. .................. 350/160 LC
3,756,694  9/1973  Soref et al. .................. 350/160 LC Primary Examiner—Edward S. Bauer
Attorney, Agent, or Firm—Homer O. Blair; Robert L. Nathans; David E. Brook

[57] ABSTRACT

A display is disclosed which contains a liquid crystal panel, a dichroic reflecting layer, and additionally contains a second wide angle back scattering material. Preferably, the second scattering material acts as a Lambertian scatterer. The display may include an external source of front-lighting, and, of course, contains suitable electrodes and substrates, and optionally contains anti-reflection coatings. The advantage of this display is that it is easily readable by an observer over a wide range of ambient lighting conditions. The outstanding readability is provided because the display has excellent color contrast.

9 Claims, 4 Drawing Figures

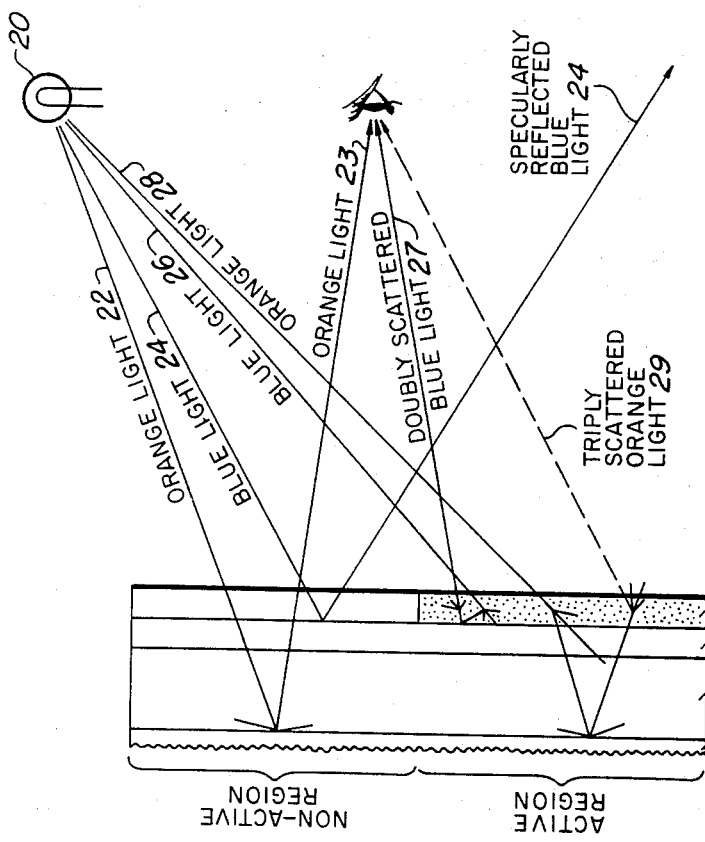
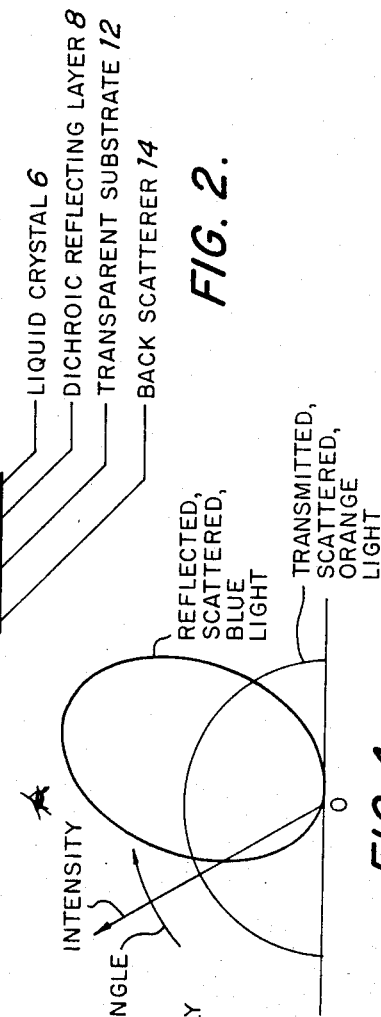
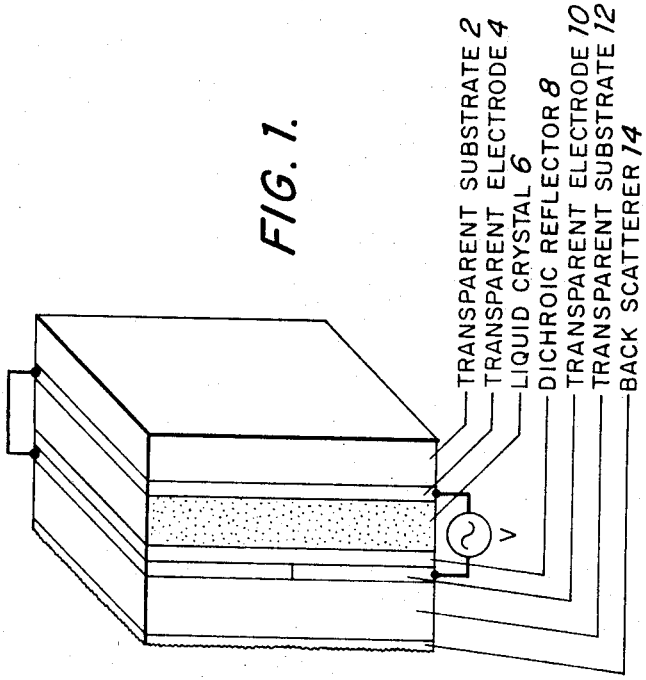
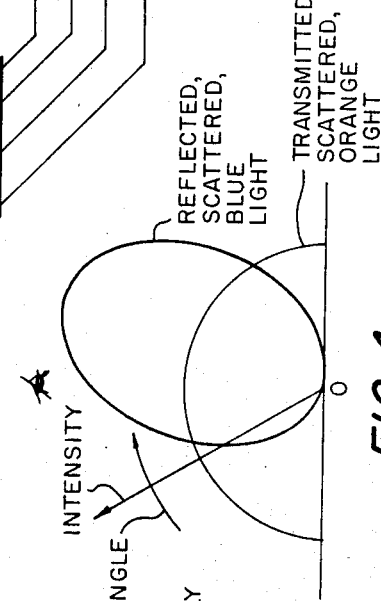
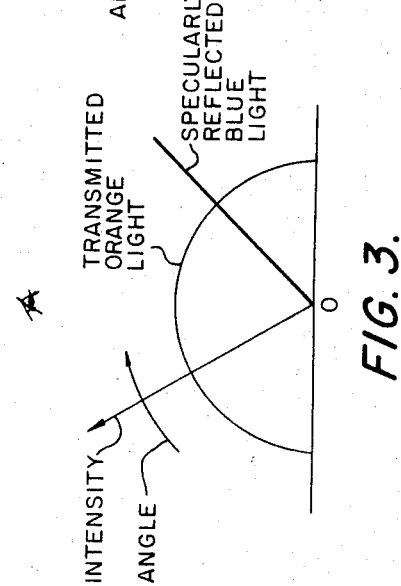

LIQUID CRYSTAL DISPLAY CONTAINING AN ADDITIONAL BROAD ANGLE BACK SCATTERING MATERIAL

BACKGROUND OF THE INVENTION

1. Field of the Invention

This invention relates to displays and particularly to flat panel displays formed from liquid crystal materials.

2. Description of the Prior Art

Recently there has been widespread interest for useful applications for the class of materials which have become known as "liquid crystals." Liquid crystals are known to appear in at least three different mesomorphic forms: the smetic, nematic and cholesteric forms. Generally, liquid crystals exhibit some physical properties typically assocaited with liquids and simultaneously exhibit other physical properties typically associated with crystalline solids. For example, their viscosities are ordinarily similar to those of liquids whereas their optical characteristics are similar to those of crystalline solids. A unique optical property of certain liquid crystal materials is their capability of dynamically scattering incident light if an electric field is applied thereacross. This capability provides many interesting applications for these liquid crystals.

One application for liquid crystal materials is in the field of displays. Liquid crystal materials have outstanding properties for this application. Thus, the- can be constructed in flat panels, require only low power to activate, have relatively simple construction, are economical, and can produce high quality displays of information having a variety of intensity and color contrasts.

As is known, liquid crystals do not generate their own light, but depend upon external light sources. Thus, the information displayed is normally bright when the display is viewed in high ambient light. However, when only low ambient conditions are available, the displayed information may be difficult to read, and in fact may have a brightness below the readability threshold of an observer.

Two methods have been proposed to overcome this problem encountered in less than high ambient light conditions. These are (1) to front-light the display, or (2) to back-light the display. In some instances, however, neither of these alternatives is fully satisfactory. For example, if display volume is limited, the designer may have no choice but to work with front-lighting since back-lighting usually adds to the total volume of the display.

Front-lighting is generally considered to be, however, an inefficient way to illuminate the liquid crystal panel in a display. Because of this, the intensity contrast desirable for good readability is sometimes unobtainable with front-lighting without expending large amounts of power, for example, viewing under highly diffuse ambient conditions. Thus, it is desirable to increase the readability by some other technique.

SUMMARY OF THE INVENTION

In one embodiment, this invention relates to the use of a second, wide angle, back scatterer in a liquid crystal panel display also containing a dichroic reflecting layer. The preferred second scatterer is a Lambertian scatterer.

The addition of a second scatterer to a liquid crystal panel display provides good readability over a wide range of ambient lighting conditions, particularly when an external front-lighting source is used.

Of course, the liquid crystal panel display also includes other layers as appropriate. Some of these include transparent electrodes, which may be continuous or segmented, anti-reflection coatings, glass substrates, and a reflecting layer.

As mentioned above, the incorporation of a second scatterer in a liquid crystal panel display produces information patterns which are easily readable over any range of ambient lighting conditions when augmented by minimal front-lighting. The increased readability is achieved because the displayed information has outstanding color contrast, even though its intensity contrast may not be as high as is normally considered desirable.

BRIEF DESCRIPTION OF THE DRAWINGS

FIG. 1 illustrates schematically a display formed from a liquid crystal panel and incorporating a second wide angle scattering layer according to this invention;

FIG. 2 illustrates in a simplified schematic fashion one possible explanation for the outstanding color contrast obtained with the combination displays described herein;

FIG. 3 illustrates graphically the light distribution from non-activated portions of a combination display of this invention;

FIG. 4 illustrates graphically the light distribution from activated portions of a combination display of this invention.

DESCRIPTION OF THE PREFERRED EMBODIMENTS

Referring now to the Figures in more detail, FIG. 1 illustrates a flat panel liquid crystal display including a second, wide angle, back scattering layer. The display consists of a transparent substrate 2, which can be glass or other transparent, non-conductive materials, upon which a transparent electrode 4 is placed. Transparent electrode 4 can be, for example, an evaporated thin layer of indium oxide or tin oxide; electrode 4 can also be segmented or continuous. Liquid crytäl material 6, which can be, for example, any of the well known dynamic scattering liquid crystals, is placed between transparent electrode 4 and light filter 8, e.g., a dichroic reflecting layer. Dichroic reflecting layer 8 can be prepared in any of the art recognized ways. See, for example, Mil-Handbook-141, Military Standardization Handbook, Optical Design, Section 20—application of Thin Film Coatings, pp. 20–39 et seq.

A second transparent electrode 10, which is shown for purposes of illustration as being segmented into an upper half and a lower half, is placed between dichroic reflector 8 and transparent substrate 12. The relative positions of dichroic reflector 8 and transparent electrode 10 may be reversed, or electrode 10 may be incorporated as one layer of dichroic reflector 8 without affecting the basic operation of the device. Transparent substrate 12 is the same as or similar to transparent substrate 2.

A voltage V is applied across the lower half of the liquid crystal layer 6, whereas the upper segmented portion is illustrated as being short circuited to show that there is no voltage across this upper half. A typical voltage for a dynamic scattering liquid crystal may be, for example, 25 volts at 30–100 Hz, although many other potentials are suitable. Under these conditions, the upper portion of liquid crystal material 6 is transparent whereas the lower portion acts as a forward dynamic scatterer.

The back layer in the display illustrated comprises a second, wide angle, back scatterer 14. Wide angle scattering surface 14 is ideally a Lambertian scatterer. As is known, Lambertian scatterers are materials which uniformly scatter light incident from any direction into the full spherical solid angle. Such materials include high quality opal glass, white paint, surfaces such as smoked magnesium chloride or magnesium oxide, etc. A preferred Lambertian scattering surface for displays as described herein can be produced by applying a coating of white paint to the outer surface of glass substrate 12 wherein the paint is pigmented with titanium dioxide particles having an average particle size of smaller than 0.3 microns.

In addition to Lambertian scatterers, any wide angle back scattering material can be used. In fact, the second scattering surface may be a forward scattering material such as a liquid crystal layer with a reflector located behind it.

FIG. 2 illustrates, in simplified schematic fashion, one possible explanation for the outstanding color contrast obtained with these devices. This theory is not intended to be binding, but is merely offered as an aid to understanding the effect achieved by the displays of this invention.

An ambient light source 20 is shown and assumed to emit only orange and blue wavelengths for simplification. Although source 20 is illustrated as being the sun in FIG. 2, it could as well be any other external source of front-lighting including incandescent, fluorescent or other lighting means. Additionally, the display has been shown in a simplified manner to only include a liquid crystal layer 6, dichroic reflecting layer 8, transparent substrate 12 and back scattering layer 14. Dichroic layer 8 is assumed to transmit orange wavelengths and reflect blue wavelengths. Additionally, the lower half of liquid crystal layer 6 is activated whereas the upper half is a non-activated region.

Orange light 22 emitted by source 20 and striking the display in the upper half simply passes through liquid crystal 6, dichroic reflector 8, and is scattered by back scatterer 14. Since back scatterer 14 is a Lambertian scatterer, the orange light is scattered through a wide solid angle. Therefore, a portion of the scattered orange light 23 is directed back through the display and reaches the observer.

On the other hand, blue light 24 from source 20 passes through liquid crystal 6 and is specularly reflected by dichroic reflector 8 away from the observer.

Blue light 26, which strikes the lower portion of the display, is forward scattered by liquid crystal material 6. The forward scattered blue light is reflected from dichroic 8, and forward scattered again by liquid crystal 6. A portion of doubly scattered blue light 27 is directed to the observer.

Orange light 28 striking the lower portion of the display is also forward scattered by liquid crystal material 6 and the scattered orange is transmitted by dichroic reflector 8. This light is strongly scattered a second time by back scatterer 14 and a small portion of this doubly scattered light is forward scattered once again by liquid crystal 6 and is directed towards the observer as triply scattered orange light 29.

As can be seen, only a small amount of orange light, relative to the blue light, reaches the eye of the observer. The exact amount of orange light reaching the observer depends upon several factors including for example, the thickness of substrate 12, the respective indices of refraction of layers 8 and 10, and the precise scattering characteristics of back scatterer 14.

The net result is that the observer sees a display having outstanding color contrast because the active portions appear blue whereas the inactive portions appear orange. This outstanding color contrast overcomes the poor readability normally associated with displays which are viewed in low ambient or a highly diffused ambient.

FIGS. 3 and 4 are a further attempt to pictorially depict a possible explanation for the outstanding color contrast obtained with this display. Both FIG. 3 and FIG. 4 are radial plots of the light distribution from the display.

FIG. 3 illustrates the distribution of orange and blue light from the non-activated portion of the display.

FIG. 4 represents the distribution of orange and blue light from the active portions of the display.

As can be seen at normal viewing angles, the intensity of blue light reaching the observer from the scattering portion of the display is much higher than that of the orange light.

Liquid crystal materials suitable for this invention are dynamic scattering liquid crystal materials. The preferred materials are nematic dynamic scattering liquid crystals. These exhibit dynamic scattering of light under an applied voltage. Typically, they exhibit negative dielectric anisotropy and conductivities in the range of about $10^{-11}$ ohm-cm. to $10^{-8}$ ohm-cm. These conductivities are sometimes obtained by doping (See Haller et al., U.S. Pat. No. 3,656,834).

These nematic dynamic scattering liquid crystal materials have been described in detail in the literature. Their preparation and fabrication into panels is also described. See, for example, British Pat. No. 1,170,486 in the names of Goldmacher and Castellano and U.S. Pat. No. 3,697,150, in the name of Wysocki; the teachings of these patents are incorporated by reference. Some specific suitable examples of nematic dynamic scattering liquid crystals are as follows:
p-methoxybenzylidene-p-n-butylanaline; p-ethoxybenzylidene-p-n-butylanaline; p-butoxybenzylidene-p-n-butylanaline; p-aminophenyl acetate; trans-4-butyl-α-chloro-4'-ethoxystilbene; trans-4-octyl-α-chloro-4'-ethoxystilbene; Licristal phase 5 (EM Laboratories; and, Licristal phase 7a (EM Laboratories). Mixtures of these dynamic scattering materials with other materials, including cholesteric and/or smectic liquid crystals, can be used, of course.

Reference is made to copending applications, U.S. Ser. Nos. 375,977, now abandoned, 375,978 and 375,980 all of which were filed on July 2, 1973 here-

What is claimed is:

1. A display which is illuminated by an external source of front lighting, comprising:
   a. a layer of liquid crystal material which exhibits dynamic scattering upon application of an electric field thereacross, said layer being positioned between a front transparent electrode and a back transparent electrode;
   b. means to selectively apply an electric field across discrete areas of said layer of liquid crystal material;
   c. a scattering reflector which scatters reflected light over a wide angle, said reflector being positioned behind said back transparent electrode; and,
   d. a dichroic reflecting layer positioned between said scattering reflector and said liquid crystal material, said dichroic reflecting layer having the characteristic of reflecting one range of visible wavelengths from said external source of front lighting and transmitting a second range of visible wavelengths from said external source of front lighting.

2. A display of claim 1 wherein said liquid crystal material comprises a nematic liquid crystal material.

3. A display of claim 2 wherein at least one of said electrodes is segmented.

4. A display of claim 3 wherein said scattering reflector comprises a Lambertian scatterer.

5. A display of claim 4 wherein said dichroic reflecting layer reflects green light and transmits red light.

6. A display of claim 4 wherein said dichroic reflecting layer reflects blue light and transmits yellow light.

7. A display of claim 4 wherein said nematic dynamic scattering liquid crystal material is selected from p-methoxybenzylidene-p-n-butylanaline; p-ethoxybenzylidene-p-n-butylanaline; p-butoxybenzylidene-p-n-butylanaline; p-aminophenyl acetate; trans4-butyl-α-chloro-4'-ethoxystilbene; trans-4-octyl-α-chloro-4'-ethoxystilbene; Licristal phase 5; and, Licristal phase 7a.

8. A display of claim 7 wherein said dichroic reflecting layer contains a transparent conductive layer.

9. A display of claim 1 wherein said scattering reflector comprises a Lambertian scatterer.

* * * * *